United States Patent
Houck (10) Patent No.: US 12,429,640 B2
(45) Date of Patent: Sep. 30, 2025

(54) OPTICAL INTERFERENCE FILTER

(71) Applicant: VIAVI Solutions Inc., Chandler, AZ (US)

(72) Inventor: William D. Houck, Santa Rosa, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 404 days.

(21) Appl. No.: 18/178,046

(22) Filed: Mar. 3, 2023

(65) Prior Publication Data

US 2023/0288620 A1    Sep. 14, 2023

Related U.S. Application Data

(60) Provisional application No. 63/269,018, filed on Mar. 8, 2022.

(51) Int. Cl.
   *G02B 5/28* (2006.01)
(52) U.S. Cl.
   CPC .................... *G02B 5/285* (2013.01)
(58) Field of Classification Search
   CPC ...................................... G02B 5/285
   See application file for complete search history.

(56) References Cited

U.S. PATENT DOCUMENTS

2020/0096684 A1    3/2020  Nguyen

FOREIGN PATENT DOCUMENTS

| EP | 3540478 A2 | 9/2019 |
|---|---|---|
| WO | 2005054928 A1 | 6/2005 |
| WO | 2015066132 A1 | 5/2015 |
| WO | 2018033801 A1 | 2/2018 |

OTHER PUBLICATIONS

CN 100385543 C machine translation (Year: 2008).*
International Search Report and Written Opinion for Application No. PCT/US2023/063904, mailed on Jun. 23, 2023, 12 Pages.
Martina Baeumler, et al.; "Optical constants and band gap of wurtzite Al1—xScxN/Al2O3 prepared by magnetron sputter epitaxy for scandium concentrations up to x=0.41"; Journal of Applied Physics 126, 045715; Jul. 31, 2019; 12 pages.

* cited by examiner

*Primary Examiner* — James A Dudek
(74) *Attorney, Agent, or Firm* — Harrity & Harrity, LLP (57) ABSTRACT

An optical interference filter includes a substrate and one or more sets of layers that are disposed on the substrate. Each set of layers includes a first layer that comprises at least scandium, aluminum, and nitrogen, and a second layer that comprises at least silicon and oxygen. The first layer may comprise at least one of a scandium aluminum nitride (ScAlN) material or a scandium aluminum nitrogen oxide (ScAlNO) material. The second layer may comprise a hydrogenated silicon (Si:H) material. An absolute value of a net stress of the one or more sets of layers may be less than or equal to 50 megapascals.

20 Claims, 5 Drawing Sheets

OPTICAL INTERFERENCE FILTER

CROSS-REFERENCE TO RELATED APPLICATION

This Patent Application claims priority to Provisional U.S. Patent Application No. 63/269,018, filed on Mar. 8, 2022, and entitled "OPTICAL INTERFERENCE FILTER." The disclosure of the prior Application is considered part of and is incorporated by reference into this Patent Application.

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The array of sensor elements may be associated with an optical filter. The optical filter may include a passband associated with a first wavelength range of light that is passed to the array of sensor elements. The optical filter may be associated with blocking a second wavelength range of light from being passed to the array of sensor elements.

SUMMARY

In some implementations, an optical interference filter includes a substrate; and a plurality of sets of layers that are disposed on the substrate, wherein each set of layers includes: a first layer that comprises at least scandium, aluminum, and nitrogen; and a second layer that comprises at least silicon and oxygen.

In some implementations, an optical interference filter includes one or more sets of layers that are disposed on a substrate, wherein each set of layers includes: a first layer that comprises at least scandium, aluminum, and nitrogen; and a second layer that comprises at least silicon and oxygen.

In some implementations, a wafer includes a plurality of optical interference filters, wherein each optical interference filter includes: a substrate; and one or more sets of layers that are disposed on the substrate, wherein each set of layers includes: a first layer that comprises at least scandium, aluminum, and nitrogen; and a second layer that comprises at least silicon and oxygen.

DETAILED DESCRIPTION

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical filter may be manufactured by forming one or more layers on a substrate. For example, a conventional optical filter may include alternating layers of at least a first material, a second material, and a third material (e.g., alternating layers of a hydrogenated silicon (Si:H) material, a silicon dioxide ($SiO_2$) material, and a tantalum pentoxide ($Ta_2O_5$) material) to allow the conventional optical filter to pass a threshold percentage of light (e.g., at least 65% of light) associated with a particular spectral range (e.g., a spectral range from 800 to 1600 nanometers (nm)). However, forming alternating layers of at least three materials is complex and can lead to formation of low quality layers, which introduces defects or allows defects to propagate through the conventional optical filter. This can degrade a performance, manufacturability, and/or a reliability of the conventional optical filter.

Further, in many cases, a stress of each of the layers of the one or more layers of the conventional optical filter is compressive (e.g., the stress of the layers is less than 0 megapascals (MPa)), which causes a stress (e.g., a net stress) of the one or more layers to be compressive. Consequently, this causes the conventional optical filter to bow (e.g., to bend). This causes the one or more layers to suffer from coating runoff, which affects a performance of the conventional optical filter. This also causes the conventional optical filter to be more fragile (e.g., as compared to a flat optical filter) and/or makes transporting, handling, and/or use of the conventional optical filter difficult.

Additionally, a filter performance of the conventional optical filter may be degraded when an angle of incidence (AOI) of light directed toward the optical filter changes from a configured incidence (e.g., 0 degrees (normal), 30 degrees, 45 degrees, and/or the like) to a threshold angle of incidence (e.g., greater than approximately 10 degrees deviation from the configured incidence, 20 degrees deviation from the configured incidence, and/or 30 degrees deviation from the configured incidence). For example, the conventional optical filter may shift toward lower wavelengths at an increase in an angle of incidence. In this way, the conventional optical filter may pass unwanted or undesired light, which may affect a sensing accuracy of an optical sensor that receives the passed light.

Angle shift may be related to an effective refractive index of an optical filter (e.g., a bandpass filter). For example, a higher effective refractive index correlates with a lower angle shift. The effective refractive index is calculable from component refractive indices of component materials of the optical filter. For example, the effective refractive index ($n_{eff}$), for an optical filter with mirrors formed from alternating high refractive index component material layers and low refractive index component material layers, may be calculated based at least in part on a set of equations of the forms:

$$n_{eff\_H} = n_H \cdot \sqrt{\frac{m - (m-1) \cdot \frac{n_L}{n_H}}{(m-1) - (m-1) \cdot \frac{n_L}{n_H} + \frac{n_H}{n_L}}} \quad (1)$$

$$n_{eff\_L} = n_L \cdot \sqrt{\frac{m - (m-1) \cdot \frac{n_L}{n_H}}{m - m \cdot \frac{n_L}{n_H} + \left(\frac{n_L}{n_H}\right)^2}} \quad (2)$$

where $n_{eff\_H}$ is a high bound for the effective refractive index for an optical filter with a high refractive index (e.g., greater than a threshold, such as greater than 2.0) layer as a spacer between the mirrors, $n_{eff\_L}$ is the effective refractive index for the optical filter with a low refractive index (e.g., less than or equal to a threshold, such as less than or equal to 2.0) layer as a spacer between the mirrors, $n_H$ is a refractive index of a high refractive index layer material of each mirror and used in the spacer for $n_{eff\_H}$, $n_L$ is a refractive index of a low refractive index layer material of each mirror and used in the spacer for $n_{eff\_L}$, and m is an order of the spacer (e.g., a size of the spacer as a multiple of ½ of the configured center wavelength of the optical filter). From these equations, a relationship between $n_{eff}$, $n_H$, $n_L$, takes the form:

$$n_H > n_{eff} > n_L \quad (3)$$

Another calculation for effective refractive index may relate to an observed wavelength shift (e.g., an angle shift) of the optical filter. For example, a wavelength shift of an optical filter (e.g., a bandpass filter) at a particular angle of incidence may be determined based on an equation of the form:

$$\lambda_\theta = \lambda_0 \sqrt{\frac{n_{eff}^2 - \sin^2\theta}{n_{eff}^2}} \quad (4)$$

where $\lambda_\theta$ represents a center wavelength at angle of incidence $\theta$ and $\lambda_0$ represents a center wavelength at an angle of incidence for which the optical filter is configured (e.g., a normal angle of incidence or another angle of incidence). The above equation can be rearranged to calculate an effective refractive index based on an observed wavelength shift:

$$n_{eff} = \frac{\lambda_0 \cdot \sin\theta}{\sqrt{\lambda_0^2 - \lambda_\theta^2}} \quad (5)$$

The above equations show that higher effective refractive indices result in lower angle shifts for filters. However, a limit to the effective refractive index of the filter is less than a refractive index of a highest refractive index material in the filter (Eq. 3).

Some implementations described herein provide an optical filter that includes one or more sets of layers disposed on a substrate. Each set of layers may include a first layer that comprises at least scandium, aluminum, and nitrogen (e.g., at least one of a scandium aluminum nitride (ScAlN) material or a scandium aluminum nitrogen oxide (ScAlNO) material) and, a second layer that comprises at least hydrogen and silicon (e.g., a hydrogenated silicon (Si:H) material). In some implementations, the optical filter passes a threshold percentage of light (e.g., at least 85% of light) associated with a particular spectral range (e.g., a spectral range from 800 to 1600 nm). In this way, the optical filter provides an improved transmittance performance as compared to a conventional optical filter. Further, the optical filter includes just two alternating layers, which reduces a complexity associated with forming the set of layers. This reduces a likelihood of formation of low quality layers, and therefore reduces a likelihood of defects being introduced in or allowed to propagate through the optical filter. Therefore, a performance, manufacturability, and/or a reliability of the optical filter is improved as compared to that of a conventional optical filter.

In some implementations, a stress of the first layer may be configured to be tensile (e.g., greater than or equal to 0 MPa) when a stress of the second layer is compressive, or vice versa. In this way, an amount of bowing caused by the one or more sets of layers disposed on the substrate may be minimized (e.g., by balancing a stress of compressive layers and a stress of tensile layers of the optical filter). For example, a first set of layers may comprise tensile material a second set of layers may comprise compressive material, which may cause the net stress of the set of layers to be approximately zero MPa (e.g., within a tolerance). This minimizes an amount of bowing of the optical filter, which reduces coating runoff and thereby improves a performance of the optical filter (e.g., as compared to a conventional optical filter that suffers from bowing). This also improves a durability of the optical filter and/or makes transporting, handling, and/or use of the optical filter easier as compared to a conventional optical filter that suffers from bowing.

Further, some implementations described herein provide a low angle shift optical filter where an effective refractive index is greater than 95% of a refractive index of a highest refractive index material in the low angle shift optical filter. For example, the low angle shift optical filter may have an effective refractive index that takes the form:

$$n_{eff} = \frac{\lambda_0 \cdot \sin\theta}{\sqrt{\lambda_0^2 - \lambda_\theta^2}} \geq 0.95 \cdot n_H \quad (6)$$

Additionally, or alternatively, the low angle shift optical filter may have an effective refractive index of greater than 100%, greater than 110%, greater than 120%, and/or the like of a refractive index of the highest refractive index material in the low angle shift optical filter. In this way, the low angle shift optical filter reduces an amount of unwanted or undesired light that is passed by the low angle shift optical filter, which improves a sensing accuracy of an optical sensor that receives light that is passed by the low angle shift optical filter.

In some implementations, the first layers of the one or more sets of layers comprise at least scandium, aluminum, and nitrogen to provide control over optical properties and stress of the first layers while preserving durability of the optical filter. For example, some materials (such as an aluminum nitride (AlN) material, a binary allow material) may be configurable to provide desired optical properties and stress characteristics, but may be associated with less than a threshold durability for some combinations of optical properties and stress characteristics. In contrast, the usage of a ScAlN material (a ternary alloy material) provides additional flexibility in control of optical properties, stress, and durability relative to a binary alloy material. For example, by manipulating the mole fraction of scandium (relative to aluminum) in the ScAlN material, an optical property (such as a refractive index) can be manipulated by modifying process conditions of deposition (e.g., sputtering) without significant change in durability or stress characteristics. Thus, flexibility of optical filter design and durability are improved, and integration complexity is reduced relative to a binary alloy. For example, the optical properties of a sputtered ScAlN material may be tuned, via composition, to substantially match a $Ta_2O_5$ material at ScAlN material compositions of around 20% scandium (by mole fraction), or to substantially match a niobium tantalum oxide ($NbTaO_x$) material at ScAlN material compositions of around 40% scandium. By using an ScAlN material to replace a $Ta_2O_5$ material in designs with an Si:H material, an optical filter can be designed without the use of interfacial $SiO_2$ layers (e.g., that would otherwise need to be included to strengthen interfaces between layers).

Furthermore, the usage of an ScAlN material provides control over physical thickness of a layer while maintaining an optical thickness of the layer. An optical thickness can be defined as the product of a physical thickness of a layer and the refractive index of the layer. The refractive index of the ScAlN material can be adjusted by modifying the mole fraction of scandium, meaning that a constant optical thickness can be maintained at a variety of layer thicknesses. This avoids having to use three or more material layers, or a more complex design, and alleviates interface issues between layers and provides for the usage of thicker layers that may be simpler to manufacture than thinner layers.

Figure 1:
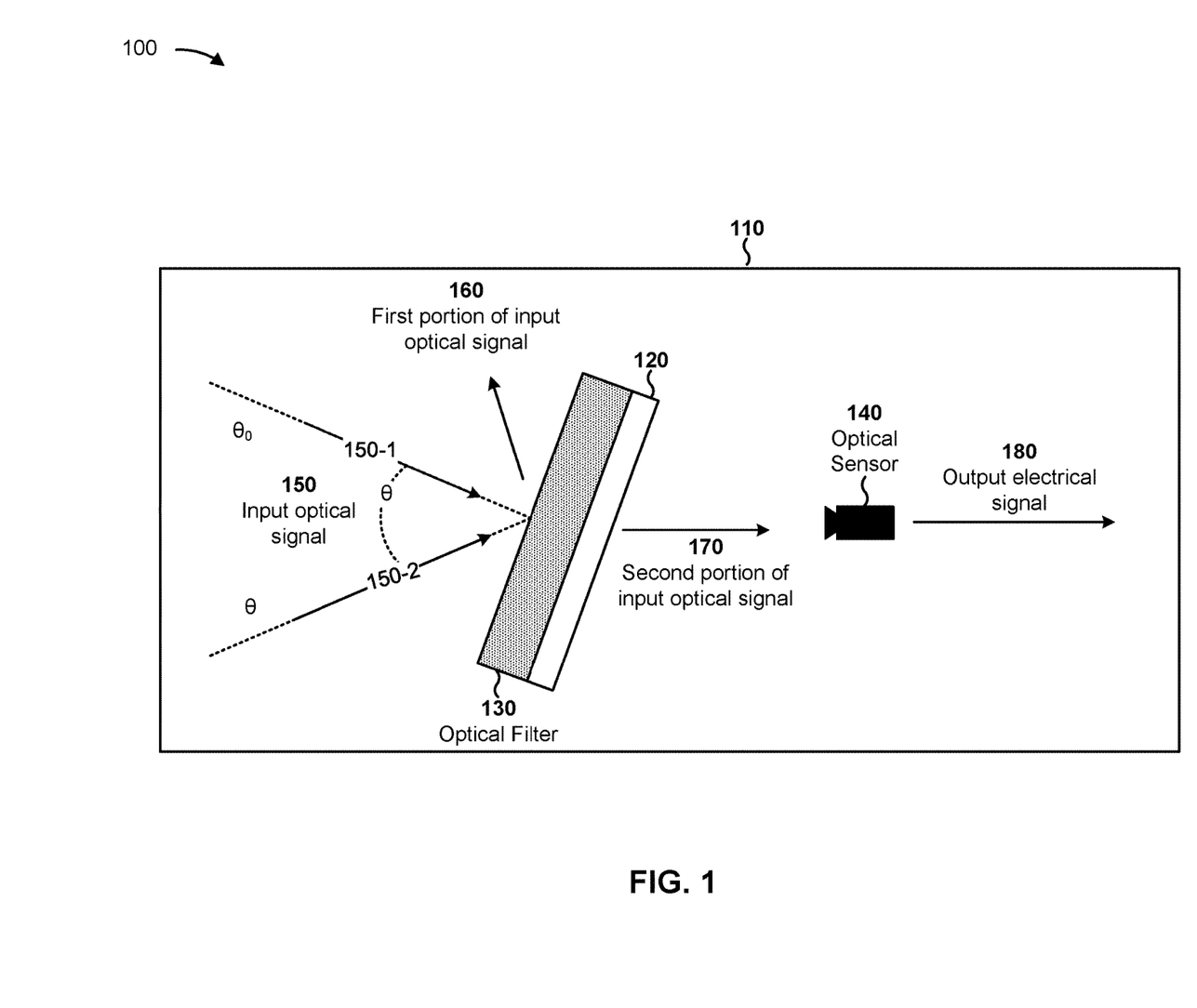
FIG. 1 is a diagram of an overview of an example implementation described herein.

FIG. 1 is a diagram of an overview of an example implementation 100 described herein. As shown in FIG. 1, example implementation 100 includes a sensor system 110. Sensor system 110 may be a portion of an optical system and may provide an electrical output corresponding to a sensor determination. Sensor system 110 includes an optical filter structure 120, which includes an optical filter 130, and an optical sensor 140. For example, optical filter structure 120 may include an optical filter 130 that performs a passband filtering functionality. In another example, an optical filter 130 may be aligned to an array of sensor elements of optical sensor 140.

Although some implementations, described herein, may be described in terms of an optical filter in a sensor system, implementations described herein may be used in another type of system, may be used external to a sensor system, or may be used in other configurations.

As further shown in FIG. 1, and by reference number 150, an input optical signal is directed toward optical filter structure 120 at one or more angles of incidence, θ. For example, input optical signals 150-1 and 150-2 may be directed toward optical filter structure 120 at angles of incidence $θ_0$ (e.g., a configured angle of incidence) and θ, respectively. The input optical signal may include, but is not limited to, light associated with a particular spectral range (e.g., a spectral range centered at approximately 900 nm, such as a spectral range of 800 nm to 1000 nm; a spectral range of 800 nm to 1600 nm; a spectral range of 800 nm to 1100 nm; a spectral range of 1400 nm to 1600 nm, such as with a peak wavelength of 1550 nm; a spectral range of 500 nm to 5500 nm; or another spectral range). For example, an optical transmitter may direct the light toward optical sensor 140 to permit optical sensor 140 to perform a measurement of the light. In another example, the optical transmitter may direct another spectral range of light for another functionality, such as a testing functionality, a sensing functionality, or a communications functionality, among other examples.

As further shown in FIG. 1, and by reference number 160, a first portion of the optical signal with a first spectral range is not passed through by optical filter 130 and optical filter structure 120. For example, dielectric filter stacks of dielectric thin film layers, which may include high index material layers and low index material layers of optical filter 130, may cause the first portion of light to be reflected in a first direction, to be absorbed, or the like. In this case, the first portion of light may be a threshold portion of light incident on optical filter 130 not included in a bandpass of optical filter 130, such as greater than 95% of light not within a particular spectral range centered at approximately 900 nm. As shown by reference number 170, a second portion of the optical signal is passed through by optical filter 130 and optical filter structure 120. For example, optical filter 130 may pass through the second portion of light with a second spectral range in a second direction toward optical sensor 140. In this case, the second portion of light may be a threshold portion of light incident on optical filter 130 within a bandpass of optical filter 130, such as greater than 50% of incident light in a spectral range centered at approximately 900 nm. The second portion of light may pass through the optical filter 130 with less than a threshold angle shift, as described in more detail herein.

As further shown in FIG. 1, based on the second portion of the optical signal being passed to optical sensor 140, optical sensor 140 may provide an output electrical signal 180 for sensor system 110, such as for use in imaging, ambient light sensing, detecting the presence of an object, performing a measurement, or facilitating communication, among other examples. In some implementations, another arrangement of optical filter 130 and optical sensor 140 may be utilized. For example, rather than passing the second portion of the optical signal collinearly with the input optical signal, optical filter 130 may direct the second portion of the optical signal in another direction toward a differently located optical sensor 140.

As indicated above, FIG. 1 is provided as an example. Other examples may differ from what is described with regard to FIG. 1.

Figure 2:
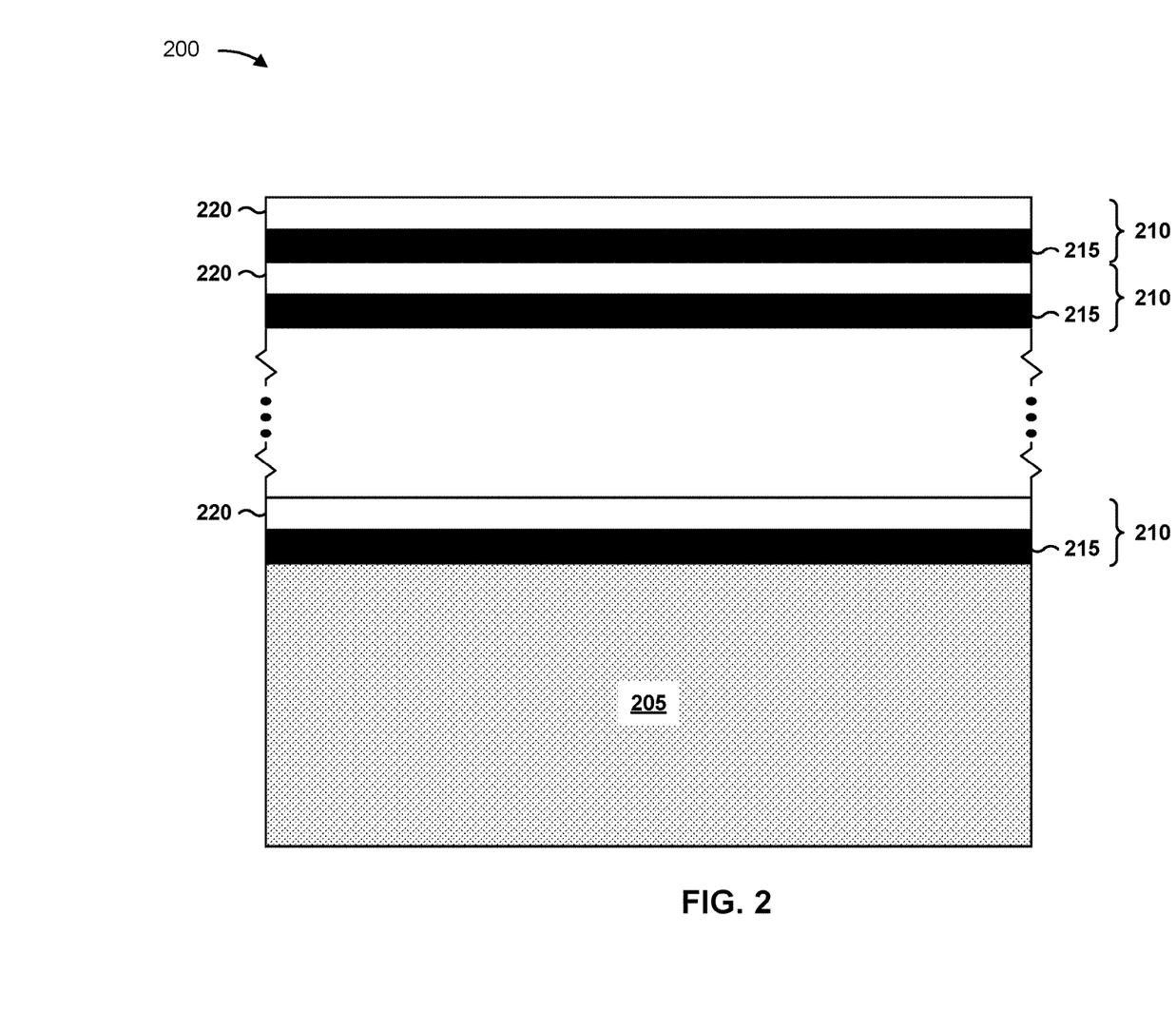
FIG. 2 is a diagram of an example optical filter.

FIG. 2 is a diagram of an example optical filter 200. In some implementations, the optical filter 200 may be an optical interference filter and/or may comprise at least one of a spectral filter, a multispectral filter, a bandpass filter, a blocking filter, a long-wave pass filter, a short-wave pass filter, a dichroic filter, a linear variable filter, a circular variable filter, a Fabry-Perot filter, a Bayer filter, a plasmonic filter, a photonic crystal filter, a nanostructure or metamaterial filter, an absorbent filter, a beam splitter, a polarizing beam splitter, a notch filter, an anti-reflection filter, a reflector, or a mirror, among other examples. FIG. 2 shows an example stack up of the optical filter 200.

As further shown in FIG. 2, the optical filter 200 may include a substrate 205 and one or more sets of layers 210 (e.g., one or more sets of optical filter layers). The substrate 205 may comprise a glass substrate, a polymer substrate, a polycarbonate substrate, a metal substrate, a silicon (Si) substrate, a germanium (Ge) substrate, or an active device wafer (e.g., that comprises a photodiode (PD), a PD array, an avalanche photodiode (APD), an APD array, a charge-coupled device (CCD) sensor, and/or a complementary metal oxide semiconductor (CMOS) sensor, among other examples). In some implementations, a thickness of the substrate 205 may be greater than or equal to 20 microns (μm), 50 μm, and/or 500 μm. Additionally, or alternatively, the thickness of the substrate may be less than or equal to a particular thickness threshold. The particular thickness threshold, for example, may be less than or equal to 5 millimeters (mm).

Each set of layers 210, of the one or more sets of layers 210, may include a first layer 215 and a second layer 220. The second layer 220 may be disposed on the first layer 215 (e.g., in a stack formation). In some implementations, the second layer 220 may be disposed directly on the first layer 215. For example, as shown in FIG. 2A, a first surface (e.g., a bottom surface) of the second layer 220 is disposed on (e.g., directly on) a surface (e.g., a top surface) of the first layer 215. Alternatively, one or more other layers may be disposed between the first layer 215 and the second layer 220.

In some implementations, the one or more sets of layers 210 may be disposed on a single surface (e.g., the top surface) of the substrate 205 (e.g., as shown in FIG. 2). Alternatively, when the optical filter 200 includes a plurality of sets of layers 210 (e.g., two or more sets of layers 210), at least one set of layers 210 may be disposed on a first surface (e.g., the top surface) of the substrate 205, and at least one other set of layers 210 may be disposed on a second surface (e.g., a bottom surface) of the substrate 205.

The first layer 215 may comprise a first material that includes at least scandium, aluminum, and nitrogen. For example, the first material may include at least one of a scandium aluminum nitride (ScAlN) material or a scandium aluminum nitrogen oxide (ScAlNO) material. The first material may additionally include one or more other elements or materials (e.g., scandium, aluminum, nitrogen, oxygen, hydrogen, an aluminum oxide (AlO) material, and/or an aluminum hydride (AlH) material). The second layer 220 may comprise a second material, which may include at least one other material (e.g., at least one material other than the first material). The second material may include at least one of a silicon (Si) material, a silicon and hydrogen (SiH) material, a hydrogenated silicon (Si:H) material, a hydrogenated silicon with helium (Si:H—He) material, a hydrogenated silicon with nitrogen (Si:H—N) material, an amorphous silicon (a Si) material, a silicon nitride (SiN) material, a germanium (Ge) material, a hydrogenated germanium (Ge:H) material, a silicon germanium (SiGe) material, a hydrogenated silicon germanium (SiGe:H) material, a silicon carbide (SiC) material, a hydrogenated silicon carbide (SiC:H) material, a tantalum pentoxide ($Ta_2O_5$) material, a niobium pentoxide ($Nb_2O_5$) material, a niobium titanium oxide ($NbTiO_x$) material, a niobium tantalum pentoxide ($Nb_{2-x}Ta_xO_5$) material, a titanium dioxide ($TiO_2$) material, an aluminum oxide ($Al_2O_3$) material, a zirconium oxide ($ZrO_2$) material, an yttrium oxide ($Y_2O_3$) material, or a hafnium oxide ($HfO_2$) material, among other examples. In some implementations, the second material may include at least hydrogen and silicon. For example, the second material may include an SiH material, an Si:H material, an Si:H—He material, and/or an Si:H—N material, and may, in some implementations, additionally include one or more other elements and/or materials (e.g., an Si material, an SiN material, a Ge material, a Ge:H material, an SiGe material, and/or so on). Alternatively, in some implementations, the second layer 220 may comprise the first material (e.g., that comprises at least scandium, aluminum, and nitrogen) and the first layer 215 may comprise the second material (e.g., that comprises at least one other material).

In some implementations, each layer of a set of layers 210 is associated with a particular thickness. For example, each of the first layer 215 and the second layer 220 may have a thickness from 2 to 2000 nm (e.g., a thickness that is greater than or equal to 2 nm and less than or equal to 2000 nm). In some implementations, the first layer 215 and/or the second layer 220 may have a thickness from 2 nm and a thickness threshold (e.g., a thickness that is greater than or equal to 2 nm and less than or equal to the thickness threshold). The thickness threshold may be, for example, less than or equal to 4 nm, 6 nm, 8 nm, 10 nm, 15 nm, 20 nm, 30 nm, 40 nm, and/or 50 nm. Accordingly, the first layer 215 and/or the second layer 220 may be termed "thin" layers when their respective thicknesses are less than or equal to the thickness threshold.

In some implementations, when the optical filter 200 includes a plurality of sets of layers 210 (e.g., two or more sets of layers 210), a layer of a first set of layers 210 may have a same or different thickness as a corresponding layer of a second set of layers 210. For example, a first layer 215 and a second layer 220 of the first set of layers 210 may have respective thicknesses that are the same as (e.g., equal to, within a threshold that may be less than or equal to 1 nm), or, alternatively, different than, corresponding thicknesses of a first layer 215 and a second layer 220 of the second set of layers 210. Accordingly, each set of layers 210, of the plurality of sets of layers 210, may have a thickness profile that is the same as, or different than, a thickness profile of another set of layers 210 of the plurality of sets of layers 210.

Further, a layer thickness of each layer in a set of layers 210 and/or a quantity of the one or more sets of layers 210 may be selected based on an intended set of optical characteristics of the optical filter 200, such as an intended passband, an intended transmissivity, and/or another optical characteristic. For example, the layer thickness of each layer in a set of layers 210 and/or the quantity of the one or more sets of layers 210 may be selected to permit optical filter 200 to be utilized for (e.g., to pass light associated with) a spectral range from 800 to 1000 nm (e.g., that is greater than or equal to 800 nm and less than or equal to 1000 nm, with a center wavelength of approximately 900 nm), a spectral range from 800 nm to 1600 nm, a spectral range from 800 nm to 1100 nm, a spectral range from 1400 nm to 600 nm (e.g., with a peak wavelength of 1550 nm), a spectral range from 500 to 5500 nm, or another spectral range. In some implementations, the usage of the first material that includes at least scandium, aluminum, and nitrogen enables control of a layer thickness and/or quantity of layers while maintaining optical characteristics of the optical filter 200. For example, by modifying the mole fraction of an ScAlN material, a refractive index of a layer that comprises the ScAlN material may be held constant while a thickness of the layer is changed, or vice versa. Thus, the usage of the first material provides flexibility in layer thickness while achieving desired optical properties at a variety of layer thicknesses.

In some implementations, the one or more sets of layers 210 may be configured to pass a threshold percentage of light associated with a particular spectral range. For example, the one or more sets of layers 210 may be configured to pass a threshold percentage of light associated with a spectral range from 800 to 1000 nm (e.g., with a center wavelength of approximately 900 nm). The threshold range, for example, may be greater than or equal to 85%, 90%, 95%, and/or 99%. In some implementations, for each layer (e.g., one of the first layer 215 or the second layer 220) in the one or more sets of layers 210 that comprise the first material that includes at least scandium, aluminum, and nitrogen, a refractive index of the layer may be between 2.2 and 2.4 for light that has a wavelength that is between 500 and 5500 nm (e.g., that is greater than or equal to 500 nm and less than or equal to 5500 nm). An extinction coefficient of each layer that comprises the first material may be less than 0.001 for light that has a wavelength that is between 500 and 5500 nm. Additionally, or alternatively, for each layer (e.g., the other one of the first layer 215 or the second layer 220) in the one or more sets of layers that comprise the at least one other material (e.g., other than at least at least scandium, aluminum, and nitrogen), a refractive index of the layer may be between 3.5 and 3.9 for light that has a wavelength that is between 500 and 5500 nm.

In some implementations, the optical filter 200 may have an effective refractive index greater than or equal to 95% of a highest value of a first refractive index of the first layers 215 in the one or more one or more sets of layers 210 and a second refractive index of the second layers 220 in the one or more sets of layers 210. For example, when the first layers 215 and the second layers 220 are arranged in a particular layer order (e.g., an alternating layer order of high refractive index and low refractive index layers), the first layers 215 and the second layers 220 may be sized to achieve an effective refractive index of, for example, greater than or equal to 95% of a highest value of the first refractive index and the second refractive index. In some implementations, the optical filter 200 may have an effective refractive index greater than or equal to 100% of the highest value of the first refractive index and the second refractive index (e.g., up to 110%, 120%, 130%, 140%, or 150% of the highest value). Accordingly, for example, the effective refractive index may be greater than or equal to 3.7, 4.0, 4.5, 5.0, and/or 5.5 when the refractive index of the second layers 220 is between 3.5 and 3.9 and greater than the refractive index of the first layers 215.

In some implementations, a stress (e.g., a net stress) of the layers of the one or more sets of layers 210 that comprise the first material that includes at least scandium, aluminum, and nitrogen may be between −1000 and 800 MPa (e.g., greater than or equal to −1000 MPa and less than or equal to 800 MPa). Additionally, or alternatively, a stress of each layer that comprises the first material may be between −1000 and 800 MPa. That is, a stress of a particular layer (e.g., a particular first layer 215 or a particular second layer 220) that comprises the first material, of the one or more sets of layers 210, may be between −1000 and 800 MPa, and a stress of another particular layer (e.g., another particular first layer 215 or another particular second layer 220) that comprises the first material, of the one or more sets of layers 210, may be between −1000 and 800 MPa. The stress of the particular layer may be the same as, or, alternatively, different than, the stress of the other particular layer. For example, the stress of the particular layer may be tensile (e.g., greater than or equal to 0 MPa) and the stress of the other particular layer may be compressive (e.g., less than 0 MPa), or vice versa.

In some implementations, an absolute value of a stress (e.g., a net stress) of the one or more sets of layers 210 may be approximately zero (0) MPa (e.g., equal to 0 MPa, within a tolerance, wherein the tolerance is less than or equal to 5 MPa). In some implementations, an absolute value of a stress (e.g., a net stress) of the one or more sets of layers 210 may be approximately equal to a particular amount of stress (e.g., equal to the particular amount of stress, within a tolerance, wherein the tolerance is less than or equal to 5 MPa). For example, the one or more sets of layers 210 may comprise a particular configuration of compressive materials and/or tensile materials, such that an absolute value of the stress of the one or more sets of layers 210 is equal to a particular amount of stress, which may be less than or equal to 50 MPa, 100 MPa, 200 MPa, 350 MPa, and/or 500 MPa, among other examples. Additionally, or alternatively, a stress (e.g., a net stress) of the one or more sets of layers 210 may allow an amount of bowing of the optical filter 200 to be less than or equal to a threshold percentage of a critical dimension of the optical filter 200 (e.g., a maximum dimension, such as one of a maximum width, a maximum length, or a maximum thickness, of the optical filter 200). For example, the one or more sets of layers 210 may comprise a particular configuration of compressive materials and/or tensile materials, such that the stress of the one or more sets of layers 210 allows an amount of bowing of the optical filter 200 (e.g., a difference between a maximum distance and a minimum distance of a median surface of the optical filter 200 from a reference plane associated with one or more edges of the optical filter 200) to be less than or equal to 10% of the critical dimension of the optical filter 200. The threshold percentage may be, for example, less than or equal to 1%, 2%, 3%, 5%, 10%, 15%, 20%, 25%, 30%, 35%, 40%, 45%, or 50%.

In some implementations, one or more other layers may be included in the optical filter 200, such as one or more protective layers, one or more cap layers (e.g., to provide environmental protection to the one or more sets of layers 210), and/or one or more layers to provide one or more other filtering functionalities (e.g., a blocker or an anti-reflection coating, among other examples). For example, in a single surface configuration, an additional layer (e.g., a cap layer), such as a dielectric layer (e.g., that comprises at least an oxide material, such as a silicon dioxide ($SiO_2$) material, a zirconium dioxide ($ZrO_2$) material, and/or an yttrium oxide ($Y_2O_3$) material; a nitride material, such as a silicon nitride ($Si_3N_4$) material, a titanium nitride (TiN) material, and/or a zirconium nitride (ZrN) material; and/or another material that provides environmental protection), may be disposed on a surface (e.g., a top surface) of the one or more sets of layers 210. As another example, in a dual surface configuration, a first additional layer may be disposed on a surface (e.g., a top surface) of a first portion of the set of layers 210 that are disposed on a surface (e.g., top surface) of the substrate 205 and a second additional layer may be disposed on a surface (e.g., a bottom surface) of a second portion of the set of layers 210 that are disposed on another surface (e.g., a bottom surface) of the substrate 205.

In some implementations, the set of layers 210 may be formed using a sputtering process. For example, the set of layers 210 may be formed using a magnetron sputtering process (e.g., a pulsed-magnetron sputtering process) to sputter the first layers 215 and/or the second layers 220 (e.g., in an alternating layer order) on the substrate 205. In this way, the optical filter 200 may be manufactured.

As indicated above, FIG. 2 is provided as an example. Other examples may differ from what is described with regard to FIG. 2.

Figure 3:
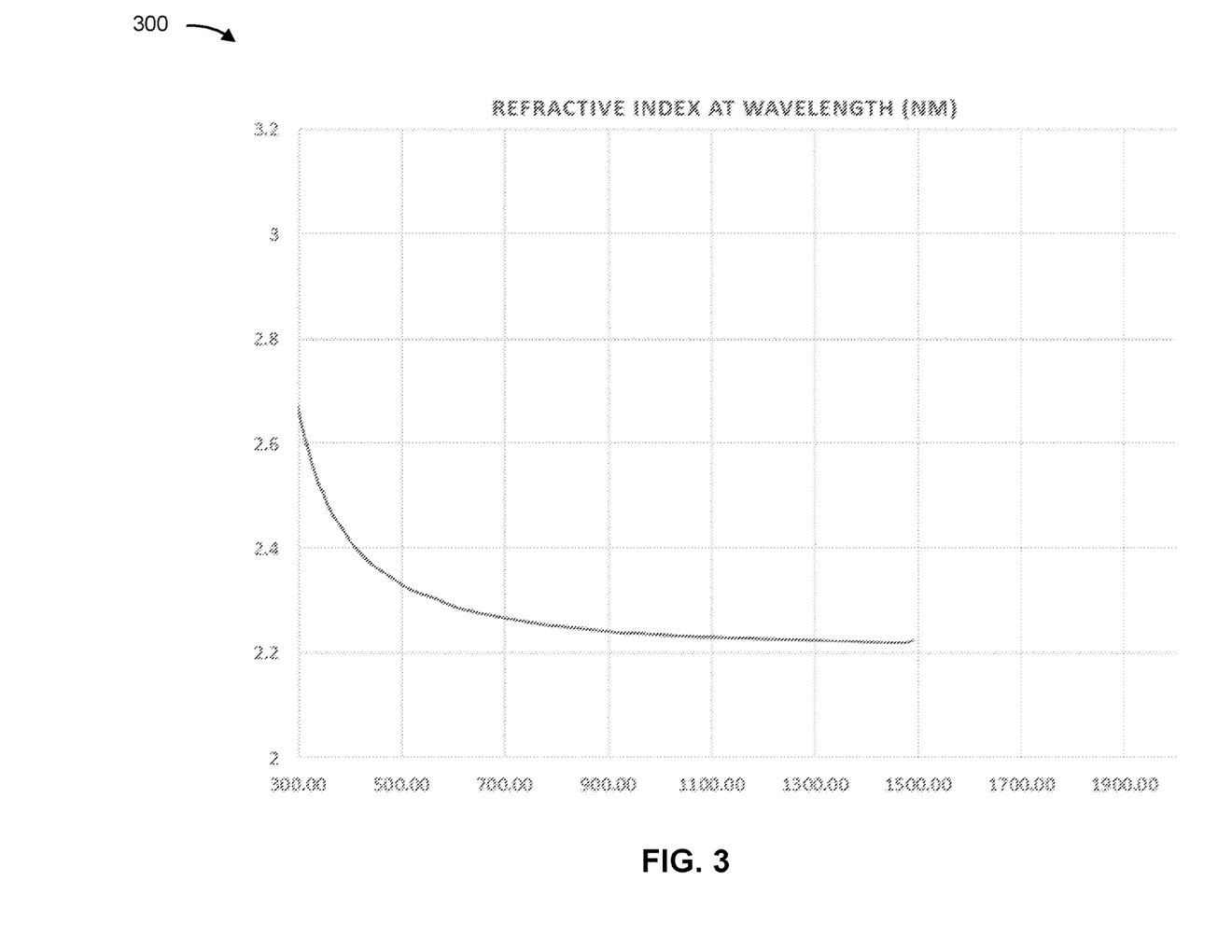
FIG. 3 is a diagram of an example plot of a refractive index (n) of one or more layers that comprise at least scandium, aluminum, and nitrogen described herein.

FIG. 3 is a diagram of an example plot 300 of a refractive index (n) of one or more layers that comprise at least scandium, aluminum, and nitrogen (e.g., at least one of an ScAlN material or an ScAlNO material) described herein. As shown in FIG. 3, the refractive index may between 2.2 and 2.4 for light that has a wavelength that is between 500 and 2000 nm.

As indicated above, FIG. 3 is provided as an example. Other examples may differ from what is described with regard to FIG. 3.

Figure 4:
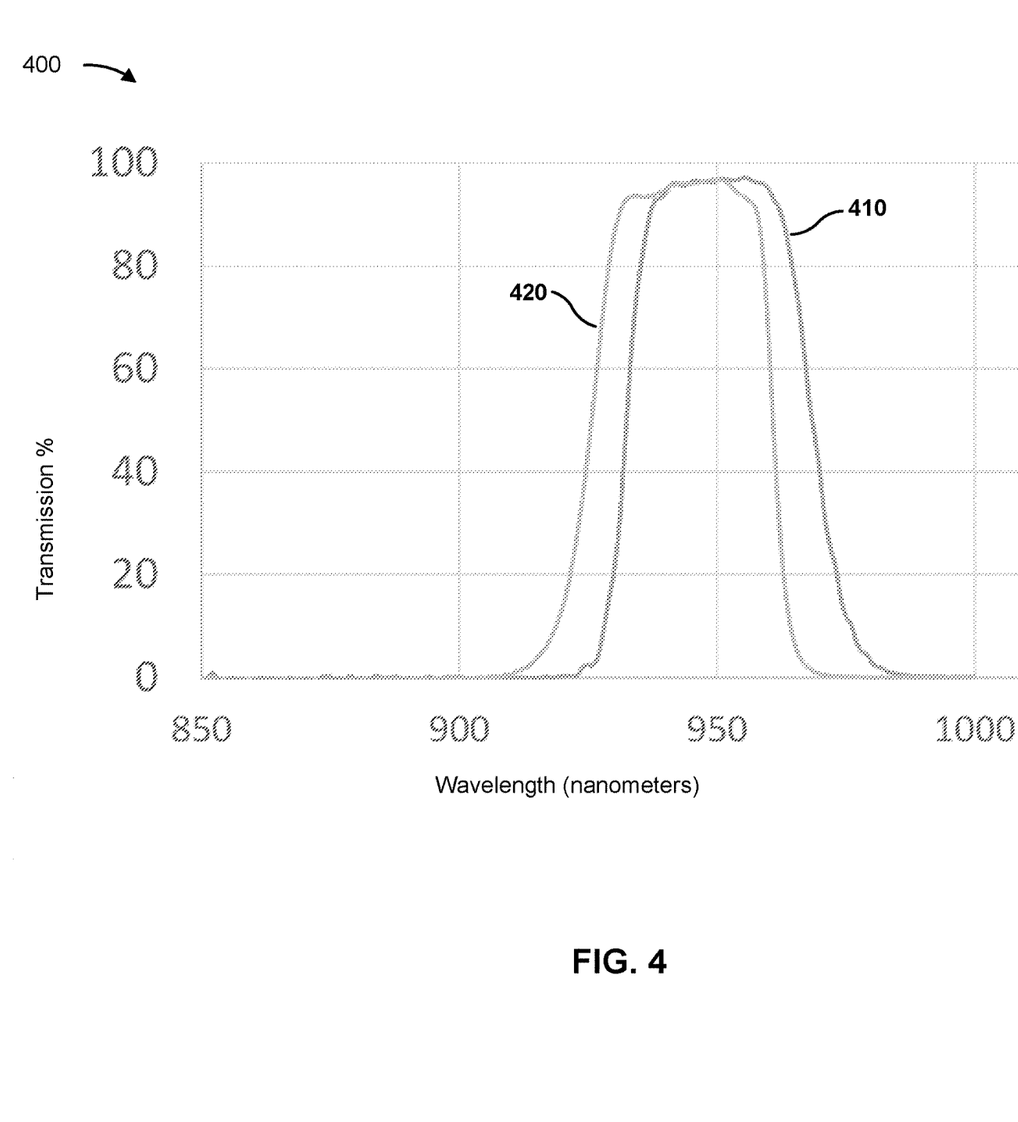
FIG. 4 is a diagram of an example plot that shows a transmittance performance and angle shift performance of the optical filter described herein.

FIG. 4 is a diagram of an example plot 400 that shows a transmittance performance and angle shift performance of the optical filter 200 described herein. As shown in FIG. 4, and by line 410, the optical filter 200 may transmit greater than 85% (with a peak of 97%) of light that has a wavelength that is between 935 and 960 nm, when the light has an angle of incidence of 0 degrees. As further shown in FIG. 4, and by line 420, the optical filter 200 may transmit greater than approximately 85% (with a peak of approximately 96%) of light that has a wavelength that is between 928 and 954 nm, when the light has an angle of incidence of 30 degrees. In some implementations, an angle shift at a center wavelength of the optical filter 200 may be less than 1.0% of the center wavelength for angles of incidence between 0 degrees and 30 degrees. For example, when the optical filter 200 is configured for a center wavelength at 940 nm, the optical filter 200 may have an angle shift of, for example, less than 9.4 nm at angles of incidence of up to 30 degrees.

In some implementations, the optical filter 200 may achieve a transmittance, at the center wavelength, of greater than a transmittance threshold, such as greater than 80%, greater than 85%, greater than 90%, and/or greater than 95% (e.g., of a peak transmissivity of the optical filter at angles of incidence between 0 to 30 degrees). Moreover, the optical filter 200 may achieve a ripple of less than +/−10%, less than +/−5%, or less than +/−1%, where the ripple represents a deviation in transmittance across the passband at angles of incidence between 0 and 30 degrees.

As indicated above, FIG. 4 is provided as an example. Other examples may differ from what is described with regard to FIG. 4.

Figure 5:
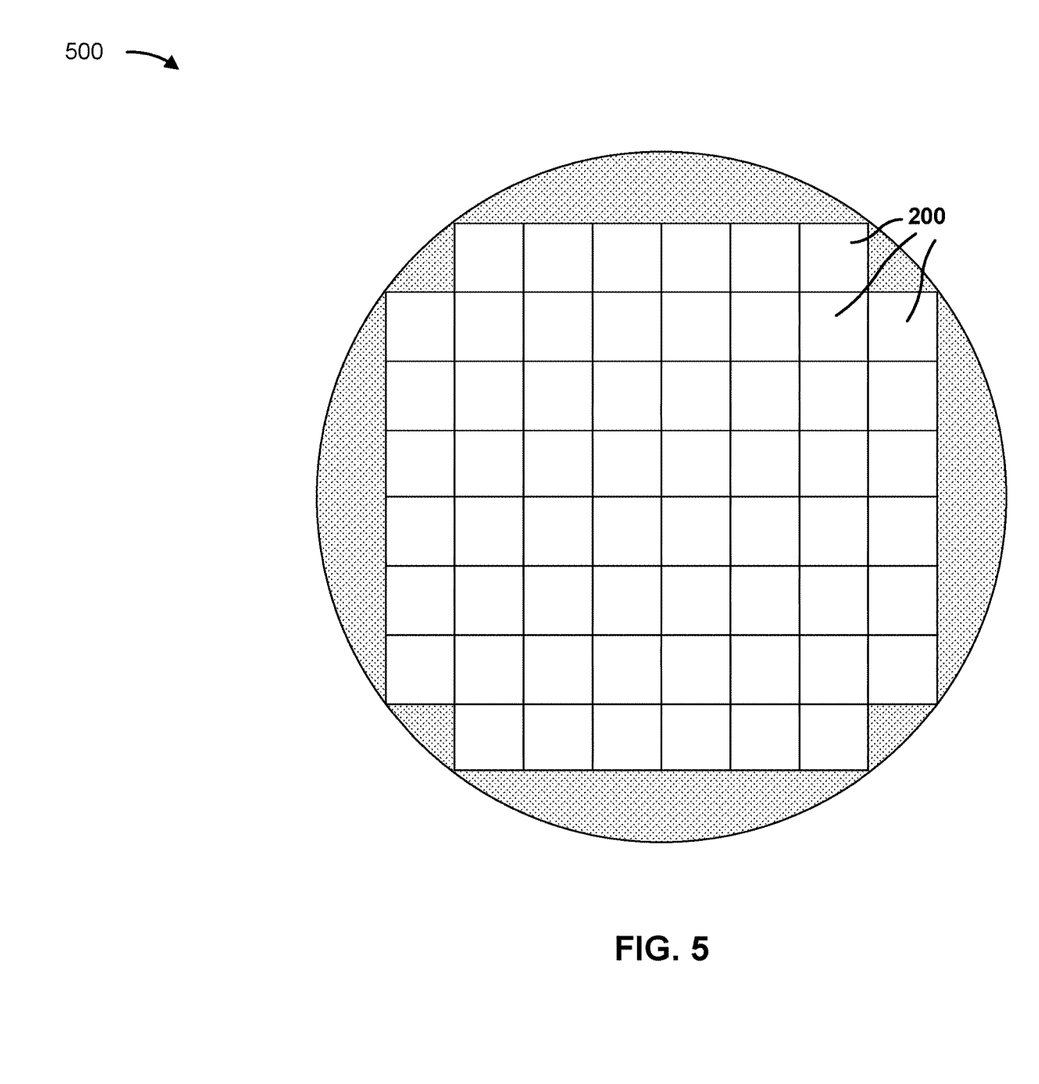
FIG. 5 is a diagram of an overview of an example wafer.

FIG. 5 is a diagram of an overview of an example wafer 500. As shown in FIG. 5, the wafer may include a plurality of optical filters 200. The plurality of optical filters 200 may be formed on the wafer 500 using a sputtering process, such as a magnetron sputtering process, a singulation process (such as a dicing process), and/or another process. In some implementations, a threshold percentage of the plurality of optical filters 200 do not include singulation defects. The threshold percentage may be, for example, greater than or equal to 50%, 55%, 75%, 85%, 95%, and/or 99%.

An optical filter 200 may include a singulation defect when a region on a surface (e.g., a top surface) of the optical filter 200 is chipped, delaminated, and/or otherwise damaged (e.g., as a result of the sputtering process and/or the singulation process), and the region is greater than or equal to a threshold size. The threshold size may be, for example, greater than or equal to 0.001%, 0.00125%, 0.0025%, 0.0050%, 0.01%, 0.05%, 0.1%, 0.5%, of an area of the surface of the optical filter 200. In some implementations, the threshold size may be greater than or equal to 10 square microns ($\mu m^2$), 20 $\mu m^2$, 30 $\mu m^2$, 40 $\mu m^2$, and/or 50 $\mu m^2$, among other examples. Accordingly, the threshold percentage of the plurality of optical filters 200 may not include damaged regions that are greater than or equal to the threshold size.

The wafer 500 may include the threshold percentage of the plurality of optical filters 200 that do not include singulation defects due to an improved durability of the plurality of optical filters 200, which is because of inclusion, in each of the plurality of optical filters 200, of the one or more sets of layers 210 described herein.

As indicated above, FIG. 5 is provided as an example. Other examples may differ from what is described with regard to FIG. 5.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

As used herein, the term "X material," where X is a chemical composition, such as AlN, $SiO_2$, or Si:H, indicates that at least a threshold percentage of X is included in the X material. The threshold percentage may be, for example, greater than or equal to 1%, 5%, 10%, 25%, 50%, 75%, 85%, 90%, 95%, and/or 99%. Also, when a material is referred to by a specific chemical name or formula, the material may include non-stoichiometric variations of the stoichiometrically exact formula identified by the chemical name. For example, the scandium aluminum nitride (ScAlN) material described herein may include $Sc_xAl_{(1-x)}N$, where x is between 0 and 0.5.

What is claimed is:

1. An optical interference filter, comprising:
a substrate; and
a plurality of sets of layers that are disposed on the substrate, wherein each set of layers includes:
a first layer that comprises at least scandium, aluminum, and nitrogen; and
a second layer that comprises at least silicon and oxygen.

2. The optical interference filter of claim 1, wherein the first layer comprises at least one of:
  a scandium aluminum nitride (ScAlN) material, or
  a scandium aluminum nitrogen oxide (ScAlNO) material.

3. The optical interference filter of claim 1, wherein the second layer comprises a hydrogenated silicon (Si:H) material.

4. The optical interference filter of claim 1, wherein a thickness of the first layer is in a range from 2 nanometers to 40 nanometers.

5. The optical interference filter of claim 1, wherein the plurality of sets of layers is configured to pass a threshold percentage of light associated with a spectral range from 800 nanometers to 1000 nanometers,
  wherein the threshold percentage of light is greater than or equal to 85%.

6. The optical interference filter of claim 1, wherein at least one set of layers, of the plurality of sets of layers, is disposed on a first surface of the substrate, and
  at least one other set of layers, of the plurality of sets of layers, is disposed on a second surface of the substrate.

7. The optical interference filter of claim 1, wherein a surface of the first layer is disposed on a surface of the second layer.

8. The optical interference filter of claim 1, wherein a net stress of the plurality of sets of layers allows an amount of bowing of the optical interference filter to be less than or equal to 3% of a critical dimension of the optical interference filter.

9. An optical interference filter, comprising:
  one or more sets of layers that are disposed on a substrate, wherein each set of layers includes:
    a first layer that comprises at least scandium, aluminum, and nitrogen; and
    a second layer that comprises at least silicon and oxygen.

10. The optical interference filter of claim 9, wherein an angle shift at a center wavelength of the optical interference filter is less than 1.0% of the center wavelength for angles of incidence between 0 degrees and 30 degrees.

11. The optical interference filter of claim 10, wherein the center wavelength is 940 nanometers.

12. The optical interference filter of claim 9, wherein an absolute value of a net stress of the one or more set of layers allows an amount of bowing of the optical interference filter to be less than or equal to 10% of a critical dimension of the optical interference filter.

13. The optical interference filter of claim 9, wherein the optical interference filter is configured to pass light associated with a spectral range from 800 to 1600 nanometers.

14. The optical interference filter of claim 9, wherein:
  the first layer has a first refractive index between 2.2 and 2.4 for light that has a wavelength that is between 500 and 5500 nanometers; and
  the second layer has a second refractive index between 3.5 and 3.9 for light that has a wavelength that is between 500 and 5500 nanometers.

15. The optical interference filter of claim 9, wherein a thickness of the first layer is in a range from 2 nanometers to 40 nanometers.

16. A wafer, comprising:
  a plurality of optical interference filters, wherein each optical interference filter includes:
    a substrate; and
    one or more sets of layers that are disposed on the substrate, wherein each set of layers includes:
      a first layer that comprises at least scandium, aluminum, and nitrogen; and
      a second layer that comprises at least silicon and oxygen.

17. The wafer of claim 16, wherein a thickness of the first layer is in a range from 2 nanometers to 40 nanometers.

18. The wafer of claim 16, wherein an absolute value of a net stress of the one or more sets of layers is less than or equal to 50 megapascals.

19. The wafer of claim 16, wherein an angle shift at a center wavelength of an optical interference filter, of the plurality of optical interference filters, is less than 1.0% of the center wavelength for angles of incidence between 0 degrees and 30 degrees.

20. The wafer of claim 16, wherein an optical interference filter, of the plurality of optical interference filters, is configured to pass light associated with a spectral range from 800 to 1600 nanometers.

* * * * *